United States Patent Office 3,274,191
Patented Sept. 20, 1966

3,274,191
N-(3-AMINOPYRAZINOYL) BENZAMIDINES AND PROCESS FOR PREPARING
Edward J. Cragoe, Jr., and John B. Bicking, Lansdale, Pa., assignors to Merck & Co., Inc., Rahway, N.J., a corporation of New Jersey
No Drawing. Filed Nov. 15, 1963, Ser. No. 323,886
14 Claims. (Cl. 260—250)

This invention relates to N-(3 - aminopyrazinoyl)-benzamidines and particularly to such compounds having additional substituents in various positions on the molecule and to processes for their preparation.

The compounds of the invention can be represented by the following general structure:

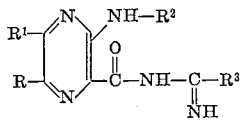

and pharmaceutically acceptable salts thereof, wherein
R represents hydrogen, halogen, trihalomethyl (for example trifluoromethyl and the like), lower alkyl, cycloalkyl having from 3 to 6 membered rings, phenyl, substituted phenyl (where the substituent preferably is lower alkyl, halo and lower alkoxy), phenyl-lower-alkyl, lower-alkylthio, phenyl-lower-alkyl-thio, lower alkylsulfonyl, or phenyl-lower-akyl-sulfonyl,
$R^1$ represents hydrogen, lower alkyl, or phenyl,
$R^2$ represents hydrogen or acyl having the formula

wherein R″ is hydrogen, lower alkyl or phenyl and
$R^3$ represents phenyl or substituted phenyl where the substituent is selected from halo, trihalomethyl (for example trifluoromethyl and the like), lower alkyl or lower alkoxy.

The designations halogen and halo in this specification and claims include bromo, chloro, iodo and fluoro.

The compounds of this invention are useful because they possess diuretic and natruretic properties. They differ from most of the known, effective diuretic agents however, in that the compounds of this invention selectively enhance the excretion of sodium ions without causing an increase in excretion of potassium ions. The potassium ion loss, which is caused by known diuretics, often results in a severe muscular weakness. Since the compounds of this invention are essentially free of this potassium depletion, they have this decided advantage as diuretics. As diuretic agents, they can be used for the treatment of edema, hypertension and other diseases known to be responsive to this therapy.

It has also been found as another feature of this invention that when coadministered with other diuretic agents known to enhance the elimination of potassium ions along with sodium ions, the novel compounds will reduce the excretion of potassium ions and thus overcome this undesirable property of the other diuretic agents. The compounds of this invention, therefore, are useful in combination with other classes of diuretic agents in order to prevent the elimination of potassium ions which otherwise would be promoted by the other diuretics. In addition, the compounds of this invention are useful by themselves as diuretic and/or saluretic agents.

In some instances, it may be desirable to use a salt of these compounds, employing a pharmaceutically acceptable acid, and these salts are to be considered as included in this invention and in the scope of the claims.

The products of this invention can be administered to man or animals in the form of pills, tablets, capsules, elixirs, injectable preparations and the like and can comprise the only essential active ingredient of the pharmaceutical formulation or, as mentioned above, they can be combined in pharmaceutical formulations with other diuretic agents or, indeed, other therapeutic agents.

The compounds of this invention are advantageously administered at a dosage range of from about 5 mg./day to about 1000 mg./day or at a somewhat higher or lower dosage at the physician's discretion, preferably in subdivided amounts on a one to four times a day regimen.

The compounds of this invention are prepared by a method which can be illustrated as follows:

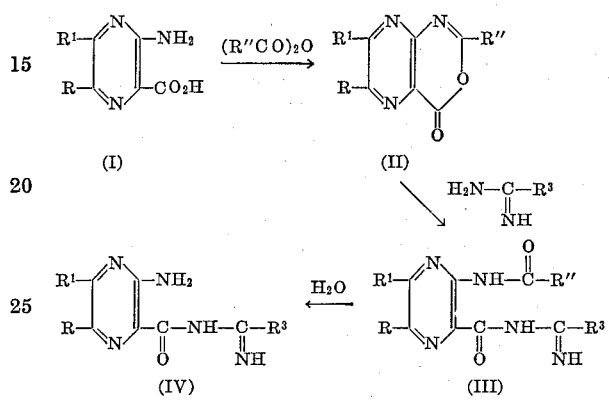

The reaction of a 3-aminopyrazinoic acid (I) with an organic acid anhydride produces the corresponding 2-substituted-4-H-pyrazino[2,3-d][1,3]oxazin-4-one (II). The anhydride is represented by the general formula

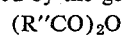

wherein R″ is as defined hereinabove. The reaction preferably is carried out at a temperature of about 70 to 130° C. and most conveniently at the reflux temperature of the mixture. The reaction usually is complete in from one to four hours and the product crystallizes from the reaction mixture and can be recovered by filtration. Typical of the anhydrides which can be used are acetic anhydride, propionic anhydride, butyric anhydride and benzoic anhydride.

Compounds of type II where R″ represents hydrogen are obtained by utilizing a mixture of formic acid and acetic anhydride.

The reaction of the 2-substituted-4-H-pyrazino[2,3-d][1,3]oxazine-4-one (II) with an amidine produces the corresponding N - (3 - acylaminopyrazinoyl)benzamidine (III). The amidine has the formula

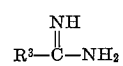

wherein $R^3$ is as defined above. Typical of the amidines which can be utilized are benzamidine, p-chlorobenzamidine, 3,4 - dichlorobenzamidine, p - bromobenzamidine, p-methylbenzamidine, p-methoxybenzamidine and p-ethoxybenzamidine.

The reaction is carried out in an aqueous media. Typical media which can be employed are mixtures of water and dioxane or water and an alcohol such as ethanol. The reaction temperature preferably is maintained in the low or moderate range with temperatures of about 10° to about 40° C. usually being optimal. The reaction usually is complete in less than 30 minutes and the product precipitates from the reaction mixture. The product can be further purified by recrystallization, e.g., from a mixture of isopropyl alcohol and dimethylformamide.

The N-(3-acylaminopyrazinoyl)benzamidine (III) is hydrolyzed readily to the N-(3-aminopyrazinoyl)benzamidine (IV). This conversion occurs in the presence of dilute mineral acids such as hydrochloric, sulfuric, hydrobromic and the like, and the reaction proceeds favorably at ambient temperature with the optimal temperature usually being in the range of about 20 to about 40° C. The reaction is complete in one to four hours. The product is recovered by filtering the reaction mixture and making the filtrate basic as, for example, by the addition of an alkali metal hydroxide which causes the product to precipitate.

The acid salts of the compounds of this invention can be prepared by any suitable method such as suspending the N-(3-aminopyrazinoyl)benzamidine compounds in water and adding the desired acid while warming slightly to effect solution. The acid addition salt often crystallizes upon cooling the reaction mixture to about 5° C. and can be separated by filtration. Particularly useful salts are the hydrohalide salts as hydrochloride, hydrobromide, the sulfate, phosphate and other inorganic acid salts as well as organic acid salts as the acetate, maleate, tartrate and the like salts. These salts are considered equivalent of the free bases for the purposes of this invention.

The intermediate 3-aminopyrazinoic acids (I) are, in most instances, novel compounds. They are prepared by one or more of a number of different methods which are outlined below.

The 3-aminopyrazinoic acids which bear a 6-halo substituent are prepared by halogenation of methyl 3-aminopyrazinoate followed by hydrolysis of the 6-halo ester to the 3-amino-6-halopyrazinoic acid. Chlorination or bromination advantageously is effected in the presence of water and a mineral acid such as hydrochloric acid, hydrobromic acid and the like or an organic acid such as acetic acid. Should a halogen atom be introduced simultaneously on the 3-amino group, this can be removed readily by the interaction of the product with a bisulfite such as an alkali metal bisulfite. The 6-iodo derivative is prepared by treating methyl 3-aminopyrazinoate with iodine and mercuric acetate.

The 3-aminopyrazinoic acids which bear alkyl, cycloalkyl, aryl, aralkyl and trifluoromethyl groups at the 5 and/or 6 positions can be prepared by one or the other of two methods which are illustrated below.

Method I: Via a Lumazine

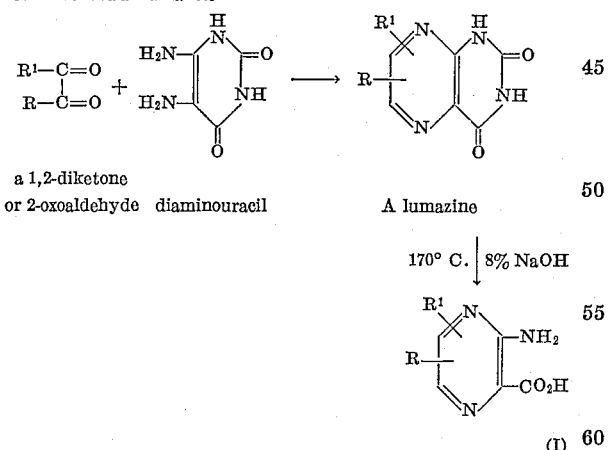

a 1,2-diketone
or 2-oxoaldehyde   diaminouracil            A lumazine

170° C. | 8% NaOH

Method: Via aminomalonomidamidine

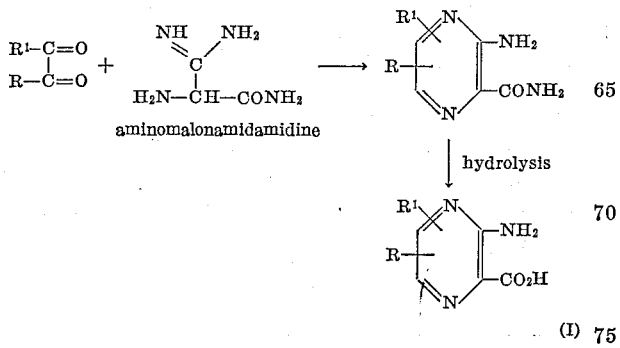

The 3-aminopyrazinoic acids which bear an alkylthio, aralkylthio, alkylsulfonyl or aralkylsulfonyl substituent at the 6-position are prepared by the following method which employs methyl 3-amino-6-chloropyrazinoate as starting material. $R^4$ in the folllowing structures is selected from the group consisting of lower alkyl or aryl-lower-alkyl.

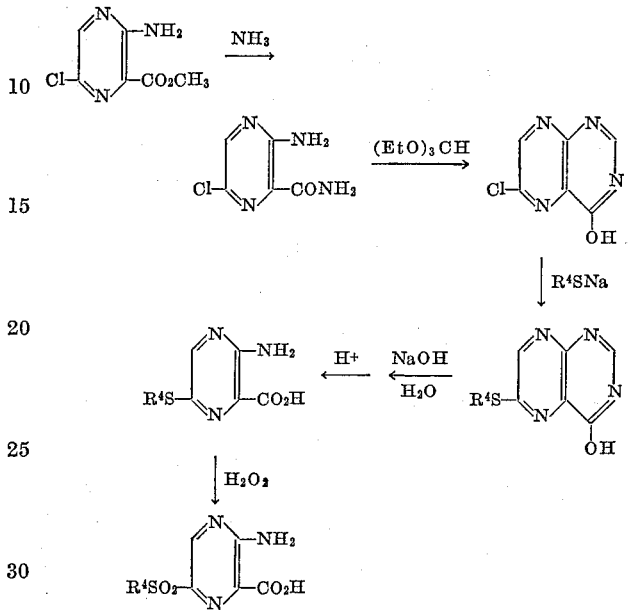

Typical of the 3-aminopyrazinoic acids which are prepared by the foregoing methods and can be utilized as starting materials for preparing the compounds of this invention are 3-amino-6-chloropyrazinoic acid,
3-amino-6-bromopyrazinoic acid,
3-amino-6-iodopyrazinoic acid,
3-amino-6(or 5)-trifluoromethylpyrazinoic acid,
3-amino-5-methylpyrazinoic acid,
3-amino-5-phenylpyrazinoic acid,
3-amino-6-methylpyrazinoic acid,
3-amino-6-phenylpyrazinoic acid,
3-amino-6-(p-chlorophenyl)pyrazinoic acid,
3-amino-6-benzylpyrazinoic acid,
3-amino-6-cyclohexylpyrazinoic acid,
3-amino-6-cyclopropylpyrazinoic acid,
3-amino-6-(methylthio)pyrazinoic acid,
3-amino-6-(benzylthio)pyrazinoic acid, and
3-amino-6-methylsulfonylpyrazinoic acid.

The following examples are illustrative of the method by which the products of this invention can be prepared and are not to be considered as limiting the invention to the particular procedural conditions employed or to the particular compounds prepared thereby.

EXAMPLE 1

*N-(3-acetamido-6-chloropyrazinoyl)benzamidine*

STEP A.—PREPARATION OF METHYL 3-AMINO-6-CHLOROPYRAZINOATE

A 5-liter, 3-necked flask equipped with a mechanical stirrer, thermometer and gas inlet tube is charged with a warm (about 38° C.) mixture of water (3180 ml.) and glacial acetic acid (750 ml.) and methyl 3-aminopyrazinoate (90 g., 0.588 mole) then is added. The stirrer is started and the mixture heated to 41° C. which causes nearly all the ester to dissolve. The solution then is cooled to just below 40° C. via an ice bath. With vigorous stirring, chlorine (about 140 g.) is passed into the solution over a period of 25 minutes. A precipitate begins to form after five minutes and becomes voluminous by the end of the reaction. The temperature drops to 20–25° C. during the reaction. The nearly white precipitate, which is methyl 3-chloroamino-6-chloropyrazinoate, is removed by filtration and washed with a small amount of ice water. A small amount of this material, when recrystallized from warm acetic acid, melts at 142° C. (dec.)

*Analysis.*—Calculated for $C_6H_5Cl_2N_3O_2$: C, 32.46; H, 2.27; N, 18.93; Cl (total) 31.94; Cl (active) 15.97. Found: C, 32.82; H, 2.34; N, 18.90; Cl (total) 32.09; Cl (active) 16.06.

The moist methyl 3-chloroamino-6-chloropyrazinoate and a solution of sodium bisulfite (150 g.) in water (900 ml.) are placed in a 4-liter beaker and stirred mechanically for one-half hour. The temperature of the mixture is maintained at 25° C. by addition of ice. The light yellow methyl 3-amino-6-chloropyrazinoate is removed by filtration, suspended in 150 ml. of ice water and filtered. This process is repeated twice with 150 ml. portions of ice water and once with a 50 ml. portion of cold isopropyl alcohol. After drying in the air, there is obtained 60 g. (55%) of methyl 3-amino-6-chloropyrazinoate, M.P. 159–161° C.

*Analysis.*—Calculated for $C_6H_6ClN_3O_2$: C, 38.42; H, 3.22; N, 22.40; Cl, 18.90. Found: C, 38.81; H, 3.54; N, 22.83; Cl, 18.39.

STEP B.—PREPARATION OF 3-AMINO-6-CHLORO-PYRAZINOIC ACID

Methyl 3-amino-6-chloropyrazinoate, from Step A (150 g., 0.8 mole) is added to a 2.5 N sodium hydroxide solution (800 ml.) and the mixture stirred and heated 1.5 hours on the steam bath. The suspension of the sodium salt of the pyrazinoic acid which results is cooled, and collected on a filter. The salt then is dissolved in 2400 ml. of boiling water and the solution filtered and acidified with concentrated hydrochloric acid. The mixture is cooled and the precipitated product is collected, washed with water, and dried in a 70° C. oven to give 127 g. (92%) of 3-amino-6-chloropyrazinoic acid, M.P. 172–174° C. (dec.). After recrystallizing from ethanol, the product melts at 178.5–179.5° C.

*Analysis.*—Calculated for $C_5H_4ClN_3O_2$: C, 34.60; H, 2.32; N, 23.66. Found: C, 34.92; H, 2.55; N, 24.21.

STEP C.—PREPARATION OF 2-METHYL-6-CHLORO-4-H-PYRAZINO[2,3-d][1,3]-OXAZIN-4-ONE

A mixture of 3-amino-6-chloropyrazinoic acid (127 g., 0.73 mole) and acetic anhydride (550 ml.) is stirred and heated one hour on the stem bath. The resulting solution is chilled. The product which crystallizes is collected on a funnel, triturated with ethyl acetate (200 ml.), recollected, and dried to constant weight in a vacuum desiccator. There is obtained 97 g. (67%) of product, M.P. 155–158° C. (dec.). Recrystallization from ethyl acetate gives material melting at 158–160° C. (dec.).

*Analysis.*—Calculated for $C_7H_4ClN_3O_2$: C, 42.55; H, 2.04; N, 21.27. Found: C, 42.59; H, 2.14; N, 21.19.

STEP D.—PREPARATION OF N-(3-ACETAMIDO-6-CHLORO-PYRAZINOYL)BENZAMIDINE

Benzamidine hydrochloride (2.8 g., 0.018 mole) is added to a solution of sodium hydroxide (0.6 g., 0.015 mole) in water (15 ml.). 6-chloro-2-methyl-4-H-pyrazino[2,3-d][1,3]oxazin-4-one (2.0 g., 0.01 mole) then is added and the mixture stirred vigorously for 20 minutes. The solid product is collected and recrystallized from a mixture of isopropyl alcohol and dimethylformamide to obtain 1.1 g. of N-(3-acetamido-6-chloropyrazinoyl)benzamidine, M.P. 196–197.5° C. (dec.).

*Analysis.*—Calculated for $C_{14}H_{12}ClN_5O_2$: C, 59.92; H, 3.81; N, 22.05. Found: C, 53.05; H, 3.92; N, 21.89.

EXAMPLE 2

*N-(3-benzamido-6-chloropyrazinoyl)benzamidine*

Following the procedure of Example 1, except that in Step C benzoic acid anhydride is substituted for acetic anhydride and the reaction is conducted at 130° C. for three hours, there is produced 2-phenyl-6-chloro-4-H-pyrazino[2,3-d][1,3]-oxazin-4-one. This latter compound is converted to N-(3-benzamido-6-chloropyrazinoyl)benzamidine following the procedure of Step D.

EXAMPLE 3

*N-(3-amino-6-chloropyrazinoyl)benzamidine*

N-(3-acetamido-6-chloropyrazinoyl)benzamidine (Example 1) (2.0 g., 0.0063 mole) is dissolved in 5% hydrochloric acid (20 ml.) and the solution let stand at room temperature for 3.5 hours. The solution is filtered and made basic with sodium hydroxide solution to precipitate the product which is recrystallized from a mixture of isopropyl alcohol and dimethylformamide to give 0.4 g. of N-(3-amino-6-chloropyrazinoyl)benzamidine, M.P. 179.5–180.5° C.

*Analysis.*—Calculated for $C_{12}H_{10}ClN_5O$: C, 52.27; H, 3.66; N, 25.40. Found: C, 52.21; H, 3.80; N, 25.19.

EXAMPLE 4

*N-(3-amino-6-chloropyrazinoyl)-p-chloro-benzamidine*

Following the procedure of Example 1, utilizing p-chlorobenzamidine hydrochloride in Step D in place of benzamidine hydrochloride, there is produced N-(3-acetamido-6-chloropyrazinoyl)-p-chlorobenzamidine which upon treatment with a 2% solution of hydrochloric acid followed by treatment with sodium hydroxide as in Example 3 yields N-(3-amino-6-chloropyrazinoyl)-p-chloro-benzamidine.

EXAMPLE 5

*N-(3-amino-6-methylpyrazinoyl)benzamidine*

Following the procedure of Example 1, utilizing 3-amino-6-methylpyrazinoic acid, there is produced N-(3-acetamido-6-methylpyrazinoyl)benzamidine. This compound is converted to N-(3-amino-6-methylpyrazinoyl)benzamidine by following the procedure of Example 3.

EXAMPLE 6

*N-(3-amino-6-phenylpyrazinoyl)benzamidine*

Following the procedure of Example 1, utilizing 3-amino-6-phenylpyrazinoic acid in place of the 3-amino-6-chloropyrazinoic acid, there is produced N-(3-acetamido-6-phenylpyrazinoyl)benzamidine which upon treatment with a 2% solution of hydrochloric acid followed by treatment with sodium hydroxide as in Example 3 yields N-(3-amino-6-phenylpyrazinoyl)benzamidine.

EXAMPLE 7

*N-(3-amino-5-methylpyrazinoyl)benzamidine*

Following the procedure of Example 1, utilizing 3-amino-5-methylpyrazinoic acid in place of the 3-amino-6-chloropyrazinoic acid there is produced N-(3-acetamido-5-methylpyrazinoyl)benzamidine which upon treatment in accordance with Example 3 yields N-(3-amino-5-methylpyrazinoyl)benzamidine.

The novel compounds of this invention can be compounded in the usual oral or parenteral dosage forms for use in therapy in the treatment of conditions resulting from an abnormal electrolyte excretion pattern of an animal organism. It will be appreciated that the dosage of each individual compound will vary over a wide range depending upon the relative potency of the selected compound and also depending upon the age and weight of the particular patient to be treated and upon the particular ailment to be treated. For these reasons, tablets, pills, capsules and the like containing, for example, from 5 to 1000 mg. or more or less active ingredient can be made available for the symptomatic adjustment of the dosage to the individual patient. As each of the compounds of this invention can be incorporated in a dosage form similar to those described in the following examples, or other usual dosage forms suitable for oral or parenteral administration, which can be prepared by well-known methods, only a few examples are included to illustrate the preparation of representative dosage forms.

EXAMPLE 8

*Compressed tablet containing 50 mg. of active ingredient*

| | Per tablet, mg. |
|---|---|
| N-(3-amino-6-chloropyrazinoyl)benzamidine | 50 |
| Calcium phosphate dibasic | 200 |
| Ethyl cellulose (as 5% solution in ethanol) | 5 |
| Unmixed granulation | 255 |
| Add: | |
| Starch, corn | 14 |
| Magnesium stearate | 1 |
| | 270 |

*Directions.*—Mix the N-(3-amino-6-chloropyrazinoyl)-benzamidine and calcium phosphate and reduce to a No. 60 powder. Granulate with Ethocel in alcohol and pass the wet granulation through a No. 10 screen. Dry the granulation at 110° F. for 12–18 hours. Dry grind to a No. 20 mesh. Incorporate the "adds" and compress into tablets each weighing 270 mg.

EXAMPLE 9

*Dry filled capsule containing 50 mg. of active ingredient*

| | Per capsule, mg. |
|---|---|
| N-(3-amino-6-methylpyrazinoyl)benzamidine | 50 |
| Lactose | 273 |
| Magnesium stearate | 2 |
| Mixed powders | 325 |

Mix the N-(3-amino-6-methylpyrazinoyl)benzamidine, lactose, and magnesium stearate and reduce to a No. 60 mesh powder. Encapsulate, filling 325 mg. in each No. 2 capsule.

The above formulations can be employed to prepare compressed tablets or capsules of other novel compounds of this invention hereinbefore described.

It is also contemplated to combine compounds of this invention in unit dosage form with other known diuretic agents, such as hydrochlorothiazide, 4'-methyl-6-chloro-spiro-[2H-1,2,4-benzothiadiazine-3(4H)-1' - cyclohexane] 7-sulfonamide-1,1-dioxide, trichloromethiazide, cyclopenthiazide, acetazolamide, dichlorophenamide, chlorthalidone, chlormerodrin, chlorazinil or spironolactone. One example of such a combination is presented below:

EXAMPLE 10

*Combination dosage form in dry filled capsule*

| | Per capsule, mg. |
|---|---|
| N-(3-amino-6-chloropyrazinoyl)benzamidine | 50 |
| Hydrochlorothiazide | 50 |
| Magnesium stearate | 2 |
| Lactose | 223 |
| Mixed powders | 325 |

Mix all of the above ingredients, reduce to a No. 60 mesh powder and encapsulate, filling 325 mg. in each No. 2 capsule.

It is further contemplated to combine compounds of this invention with hypotensive agents, or steroids or other desired therapeutic agents in suitable dosage form.

While the above examples describe the preparation of certain compounds which are illustrative of the novel compounds of this invention, and certain specific dosage forms suitable for administering the novel compounds, it is to be understood that the invention is not to be limited to the specific compounds described in the examples or by the specific reaction conditions described for the preparation of these compounds or by the specific ingredients included in the pharmaceutical preparations, but is to be understood to embrace variations and modifications thereof which fall within the scope of the appended claims.

What is claimed is:

1. A compound selected from the group consisting of a N-(3-aminopyrazinoyl)benzamidine having the structural formula

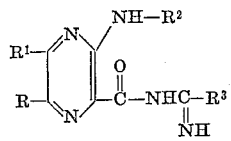

and pharmaceutically acceptable salts thereof wherein

R is selected from the group consisting of hydrogen, halo trifluoromethyl, lower alkyl, and phenyl;
R¹ is selected from the group consisting of hydrogen and lower alkyl;
R² is selected from the group consisting of hydrogen and

wherein R" is selected from the group consisting of lower alkyl and phenyl;
R³ is selected from the group consisting of phenyl and halophenyl.

2. N-(3-acetamido-6-chloropyrazinoyl)benzamidine.
3. N-(3-benzamido-6-chloropyrazinoyl)benzamidine.
4. N-(3-amino-6-chloropyrazinoyl)benzamidine.
5. N-(3-amino-6-methylpyrazinoyl)benzamidine.
6. N-(3-amino-6-phenylpyrazinoyl)benzamidine.
7. N-(3-amino-5-methylpyrazinoyl)benzamidine.
8. N-(3-amino-6-chloropyrazinoyl)-p - chlorobenzamidine.
9. A process for producing an N-(3-acylaminopyrazinoyl)benzamidine which comprises the reaction of a benzamidine with a 4H-pyrazino[2,3-d][1,3-]oxazin-4-one.
10. A process for producing an N-(3-acylaminopyrazinoyl)benzamidine which comprises the reaction of a benzamidine having the formula

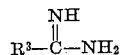

wherein R³ is a phenyl radical, with a 2-R"-6-R-7-R¹-4-H-pyrazino-[2,3-d][1,3]oxazin-4-one wherein R" is selected from the group consisting of hydrogen, lower alkyl and phenyl, R is selected from the group consisting of hydrogen, halogen trifluoromethyl, lower alkyl and a phenyl group and R¹ is selected from the group consisting of hydrogen and lower alkyl.

11. The process of claim 10 wherein said reaction is carried out in an aqueous solvent at a temperature of about 10 to about 40° C.

12. A process for producing N-(3-acetamido-6-chloropyrazinoyl)benzamidine which comprises the reaction of benzamidine with 2-methyl-6-chloro-4-H - pyrazino[2,3-d][1,3]oxazin-4-one in an aqueous reaction medium at a temperature of about 10 to about 40° C.

13. A process for producing an N-(3-aminopyrazinoyl)benzamidine which comprises treating an N-(3-acylaminopyrazinoyl)benzamidine with a dilute mineral acid to produce the corresponding N - (3 - aminopyrazinoyl)benzamidine.

14. A process for producing N-(3-amino - 6 - chloropyrazinoyl)benzamidine which comprises the reaction of benzamidine with 2-methyl-6-chloro-4-H - pyrazino[2,3-d][1,3]oxazin-4-one in an aqueous reaction medium at a temperature of about 10 to about 40° C. and then treating the resulting product with a dilute mineral acid.

No references cited.

NICHOLAS S. RIZZO, *Primary Examiner.*

HENRY R. JILES, *Examiner.*